United States Patent
Sudbrink et al.

(10) Patent No.: US 9,516,798 B2
(45) Date of Patent: *Dec. 13, 2016

(54) FOLDING SEQUENCE OF ENTIRE AGRICULTURAL TILLAGE IMPLEMENT

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,345

(22) Filed: Oct. 30, 2014

(65) Prior Publication Data

US 2015/0156957 A1 Jun. 11, 2015

Related U.S. Application Data

(60) Provisional application No. 61/914,502, filed on Dec. 11, 2013.

(51) Int. Cl.
| | |
|---|---|
| *A01B 73/06* | (2006.01) |
| *A01B 29/04* | (2006.01) |
| *A01B 73/04* | (2006.01) |

(52) U.S. Cl.
CPC ........... *A01B 29/048* (2013.01); *A01B 73/044* (2013.01); *A01B 73/065* (2013.01)

(58) Field of Classification Search
CPC ..... A01B 73/02; A01B 73/048; A01B 73/065; A01B 73/005; A01B 73/00; A01B 73/06; A01B 73/067

See application file for complete search history.

(56) References Cited

U.S. PATENT DOCUMENTS

| | | | | |
|---|---|---|---|---|
| 2,828,680 | A | | 4/1958 | Johnson |
| 3,333,645 | A | * | 8/1967 | Gustafson ............ A01B 23/043 172/311 |
| 3,588,139 | A | | 6/1971 | Bayne |
| 4,320,805 | A | | 3/1982 | Winter |
| 5,251,704 | A | * | 10/1993 | Bourgault .............. A01B 49/04 172/247 |
| 5,524,712 | A | * | 6/1996 | Balmer .................. A01B 35/04 172/286 |
| 5,641,026 | A | * | 6/1997 | Balmer .................. A01B 35/04 172/286 |
| 5,839,516 | A | * | 11/1998 | Arnold ................. A01B 73/065 172/311 |

(Continued)

*Primary Examiner* — Matthew D Troutman
(74) *Attorney, Agent, or Firm* — Rebecca L. Henkel

(57) ABSTRACT

An agricultural tillage implement including a main frame section having a pull hitch tube extending in a travel direction is provided, including a tool bar coupled with and extending transverse to the pull hitch tube, and a plurality of wing sections pivotally coupled with the main frame section about generally vertical axes. Each of the plurality of wing sections have at least one pivoting wing front shank frame. A main shank frame straddles the pull hitch tube. The main shank frame, the pivoting wing front shank frames, and the wing sections articulate from an operating configuration to a transport configuration. A controller for controlling the agricultural tillage implement controls the sequence in which the parts articulate.

20 Claims, 9 Drawing Sheets

(56) References Cited

U.S. PATENT DOCUMENTS

| | | | |
|---|---|---|---|
| 6,141,612 A * | 10/2000 | Flamme | A01B 63/1117 111/177 |
| 6,263,977 B1 | 7/2001 | Mayerle et al. | |
| 6,269,887 B1 | 8/2001 | Friggstad | |
| 6,374,923 B1 | 4/2002 | Friggstad | |
| 6,415,873 B1 * | 7/2002 | Hudgins | A01B 35/16 172/311 |
| 6,550,543 B1 | 4/2003 | Friggstad | |
| 7,581,597 B2 * | 9/2009 | Neudorf | A01B 73/067 172/1 |
| 7,926,247 B2 | 4/2011 | Van Den Engel | |
| 8,118,110 B2 | 2/2012 | Tamm et al. | |
| 8,342,256 B2 | 1/2013 | Adams et al. | |
| 2007/0240889 A1 * | 10/2007 | Neudorf | A01B 73/067 172/311 |
| 2010/0025056 A1 * | 2/2010 | Friggstad | A01B 73/067 172/452 |
| 2011/0284252 A1 * | 11/2011 | Friggstad | A01B 63/32 172/310 |
| 2011/0290513 A1 * | 12/2011 | Yuen | A01B 73/048 172/459 |
| 2011/0315411 A1 * | 12/2011 | Adams | A01B 73/02 172/311 |
| 2014/0034342 A1 * | 2/2014 | Friggstad | A01B 73/067 172/663 |
| 2014/0069670 A1 * | 3/2014 | Friesen | A01B 73/02 172/311 |

* cited by examiner

FOLDING SEQUENCE OF ENTIRE AGRICULTURAL TILLAGE IMPLEMENT

CROSS REFERENCE TO RELATED APPLICATIONS

This is a non-provisional application based upon U.S. provisional patent application Ser. No. 61/914,502 entitled "TILLAGE IMPLEMENT WITH FOLDABLE SHANK FRAME", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (a.k.a. crumbler) basket, drag tines, etc., or any combination thereof.

As agricultural tillage implements become wider and wider over time, it becomes more difficult to keep the transport size of the implement within manageable limits. It also becomes more difficult to convert the agricultural tillage implement from an operating configuration to a transport configuration, or vice versa, without requiring too much time and difficulty on the part of the operator. It is desirable for the agricultural tillage implement to be converted from one mode to the other while the operator remains within the operator cab, through the use of hydraulics or other actuators. It is also desirable for the agricultural tillage implement to remain within certain geometric constraints so that it is not necessary to use a separate "escort vehicle" or the like when traveling on public roads.

SUMMARY OF THE INVENTION

The present invention provides an agricultural tillage implement with wing sections that are foldable to a compact transport configuration.

The invention in one form is directed to an agricultural tillage implement including a main frame section having a pull hitch tube extending in a travel direction, and a tool bar attached to and extending transverse to the pull hitch tube, and a plurality of pivotally coupled wing sections coupled with the main frame section. The main frame section has a main shank frame pivotally attached to the tool bar in such a way that it may be pivoted up and over the tool bar when in a transport configuration, or may be pivoted down and forward of the tool bar when in an operating configuration. The plurality of pivotally coupled wing sections can be pivoted about at least one generally vertical axis forward to a position adjacent to and generally parallel with the pull hitch tube when in the transport configuration, or may be pivoted about the at least one generally vertical axis outward to a position perpendicular to the pull hitch tube when in the operating configuration. Each of the pivotally coupled wing section has a wing front shank frame pivotally coupled to it, which wing front shank frame may be pivoted to a generally vertical position when in the transport configuration, or may be pivoted to a generally horizontal position when in the operating configuration. A controller for controlling the main shank frame, the plurality of coupled wing sections, and the wing front shank frames controls the sequence in which the main shank frame, the plurality of wing sections, and the wing front shank frames are moved from their respective positions in the folding sequence from the operating configuration to the transport configuration, and in the unfolding sequence from the transport configuration to the transport configuration.

The invention in another form is directed to a controller for controlling an agricultural tillage implement, which controller is operable to reconfigure the agricultural tillage implement from an operating configuration to a transport configuration using a folding sequence of steps. The first step of the folding sequence involves pivoting a main shank frame up and over a tool bar transversely attached to a pull hitch tube of a main frame section. The second step of the folding sequence involves pivoting wing front shank frames which are pivotally attached to a plurality of wing sections to a generally vertical position. The third step of the folding sequence involves pivoting the plurality of wing sections which are pivotally attached to the main frame section about at least one generally vertical axis forward to a position adjacent to and generally parallel with the pull hitch tube of the main frame section.

The invention in yet another form is directed to a method of reconfiguring an agricultural tillage implement from an operating configuration to a transport configuration. The method of reconfiguring the agricultural tillage implement includes the steps of pivoting a main shank frame up and over a tool bar transversely attached to a pull hitch tube of a main frame section, pivoting wing front shank frames which are pivotally attached to a plurality of wing sections to a generally vertical position, and pivoting the plurality of wing sections which are pivotally attached to the main frame section forward about at least one generally vertical axis to a position adjacent to and generally parallel with the pull hitch tube of the main frame section.

An advantage of the present invention is that the agricultural tillage implement may be quickly and efficiently reconfigured from the operating configuration to the transport configuration.

Another advantage is that the transport configuration of the agricultural tillage implement is kept within manageable limits while still allowing for the desired width and functionality of the agricultural tillage implement when in the operating configuration.

Another advantage is that reconfiguring the agricultural tillage implement from operating configuration to transport configuration and vice versa is accomplished without excessive time and difficulty on the part of the operator, and without requiring the operator to exit the operator cab.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
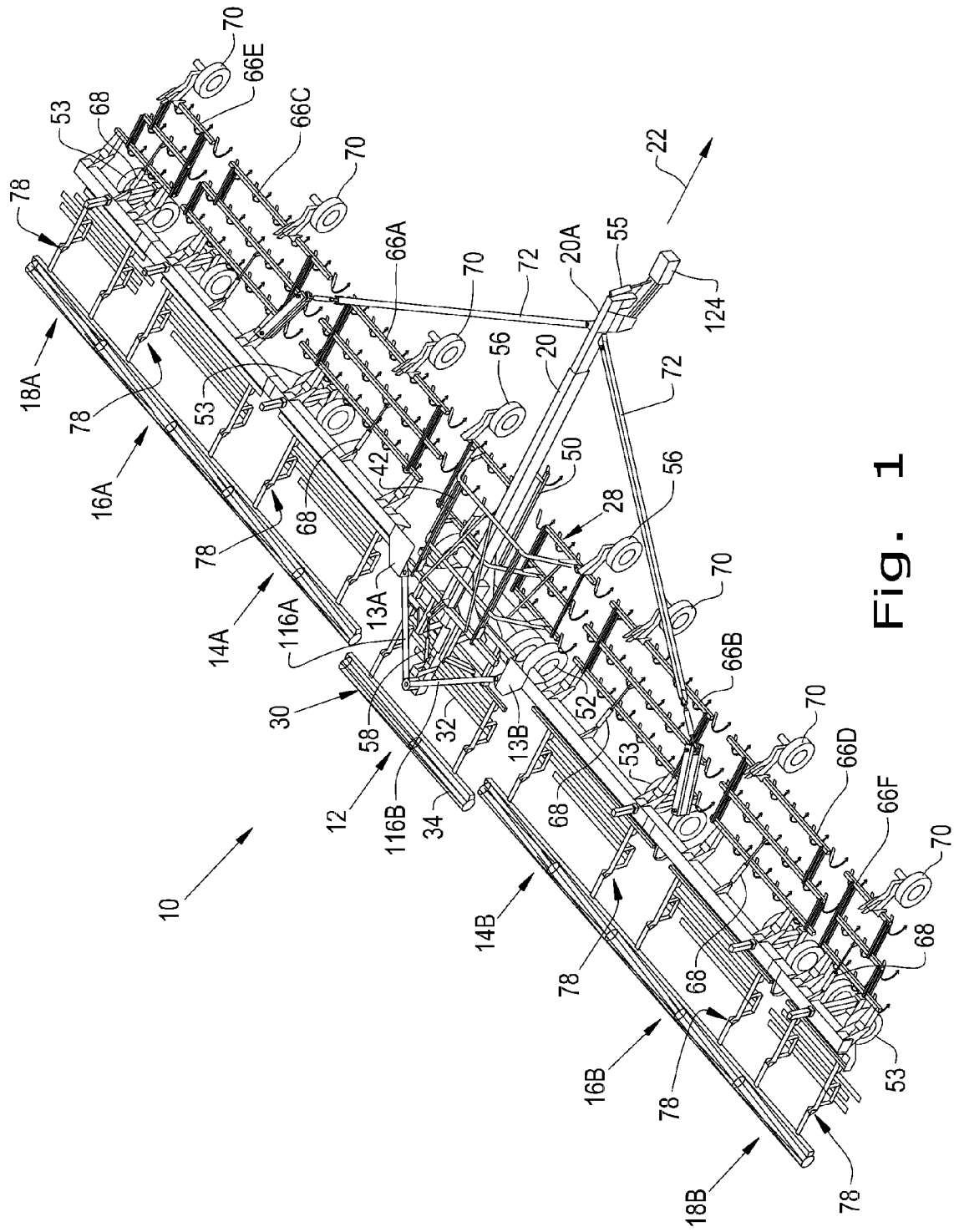
FIG. 1 is a top perspective view of an embodiment of an agricultural tillage implement of the present invention, in the form of a field cultivator.

Referring now to the drawings, and more particularly to FIGS. 1 through 5, there is shown an embodiment of an agricultural tillage implement of the present invention. In the illustrated embodiment, the agricultural tillage implement 10 is in the form of a field cultivator for tilling and finishing soil prior to seeding.

Agricultural tillage implement 10 is configured as a multi-section field cultivator, and includes a main frame section 12 and a plurality of wing sections 14A, 14B, 16A, 16B, 18A, and 18B. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections. Intermediate wings 13A and 13B may be attached to main frame section 12, and may provide generally vertical axes 86 and 88 about which the plurality of wing sections 14A, 14B, 16A, 16B, 18A, and 18B pivot.

Figure 2:
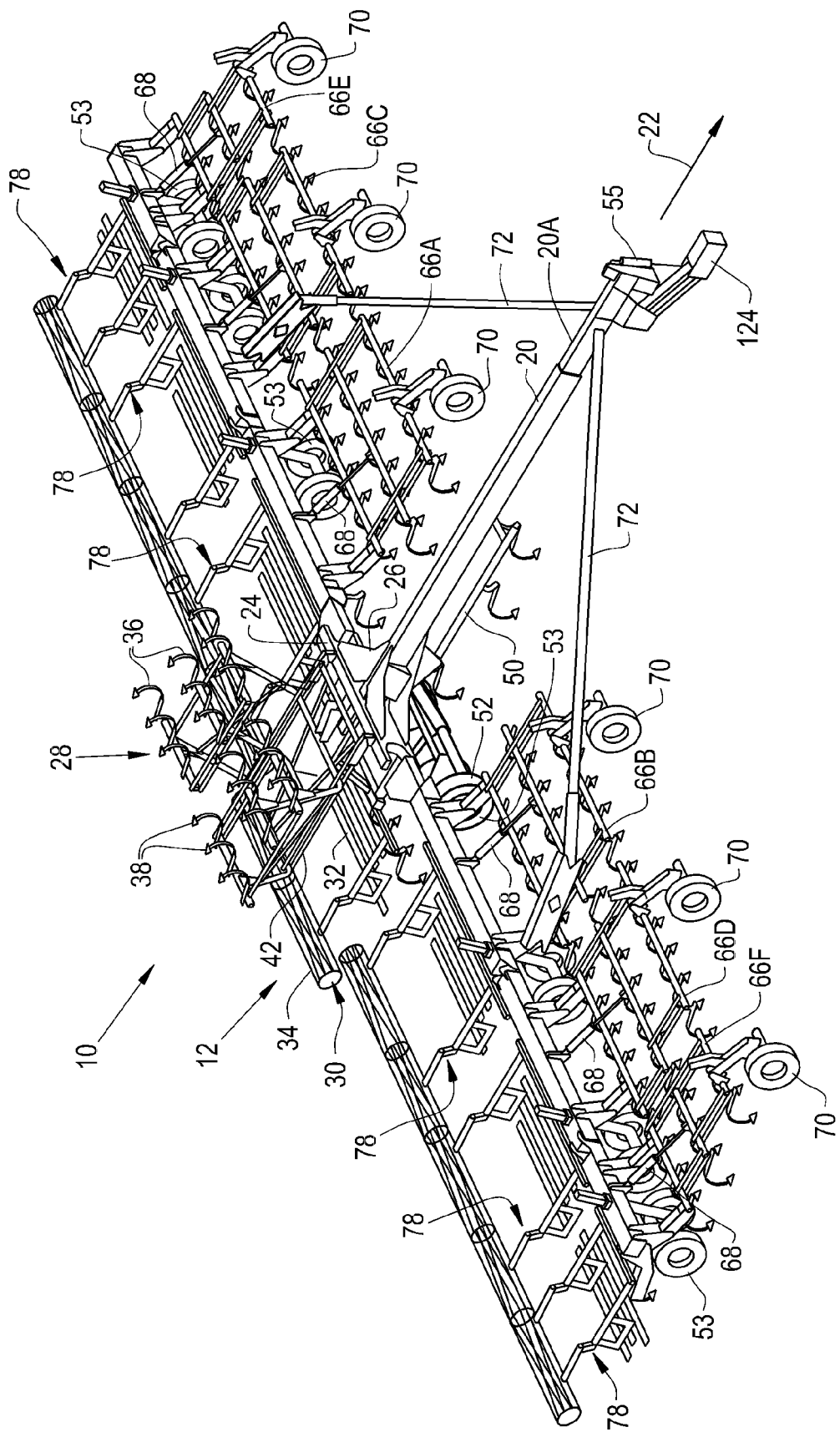
FIG. 2 is the same top perspective view shown in FIG. 1, with the main shank frame folded to a transport configuration.
Figure 3:
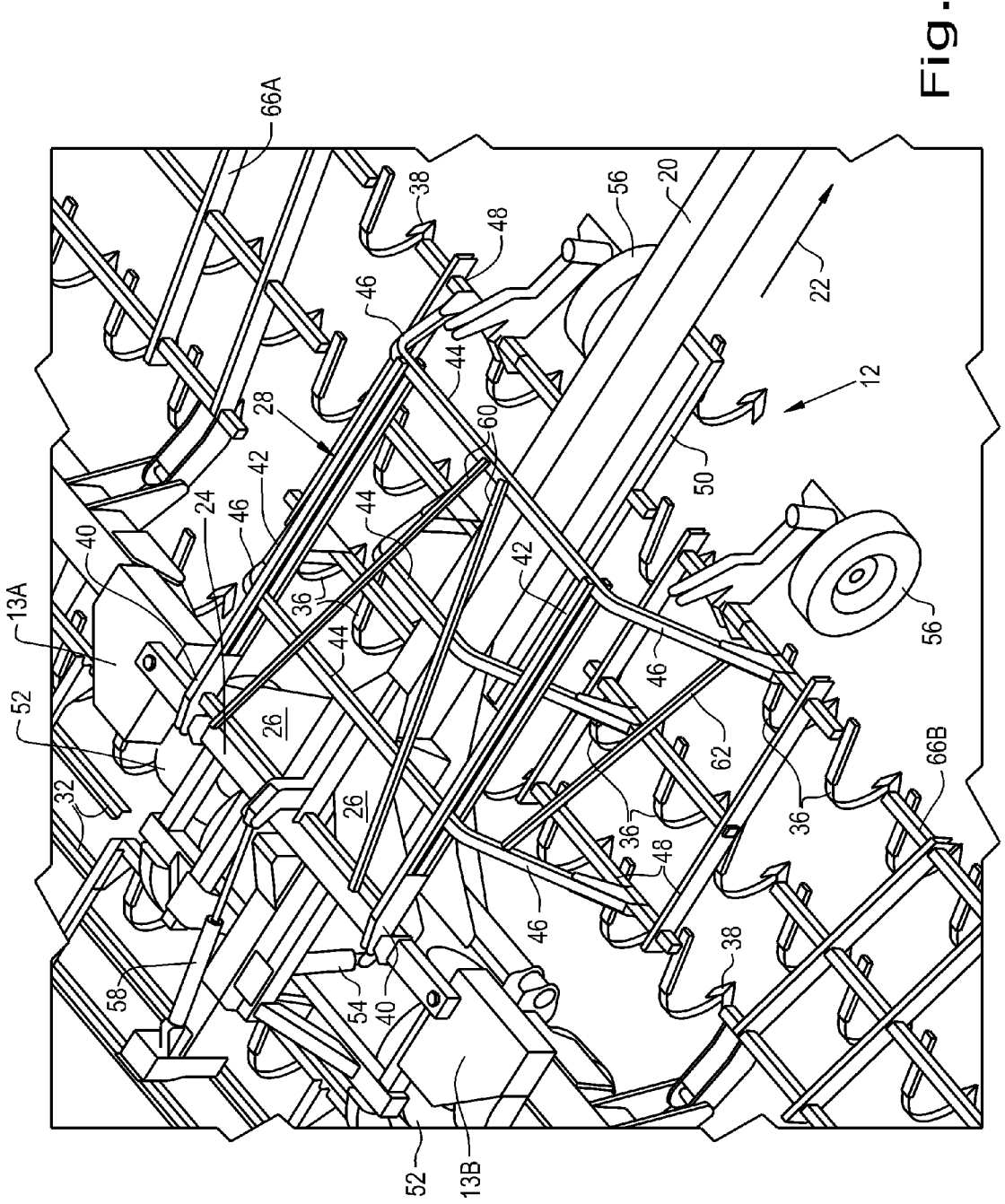
FIG. 3 is a top perspective view of the center frame section with the main shank frame in the operating configuration.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a main shank frame 28 for tilling the soil, and a main rear auxiliary implement 30 for finishing the soil. Main rear auxiliary implement 30 includes a spring tooth drag 32 and a rolling (a.k.a., crumbler) basket 34 which coact with each other to finish the soil. However, main rear auxiliary implement 30 can be differently configured, such as a spike tooth drag, cultivator shanks, etc.

Figure 4:
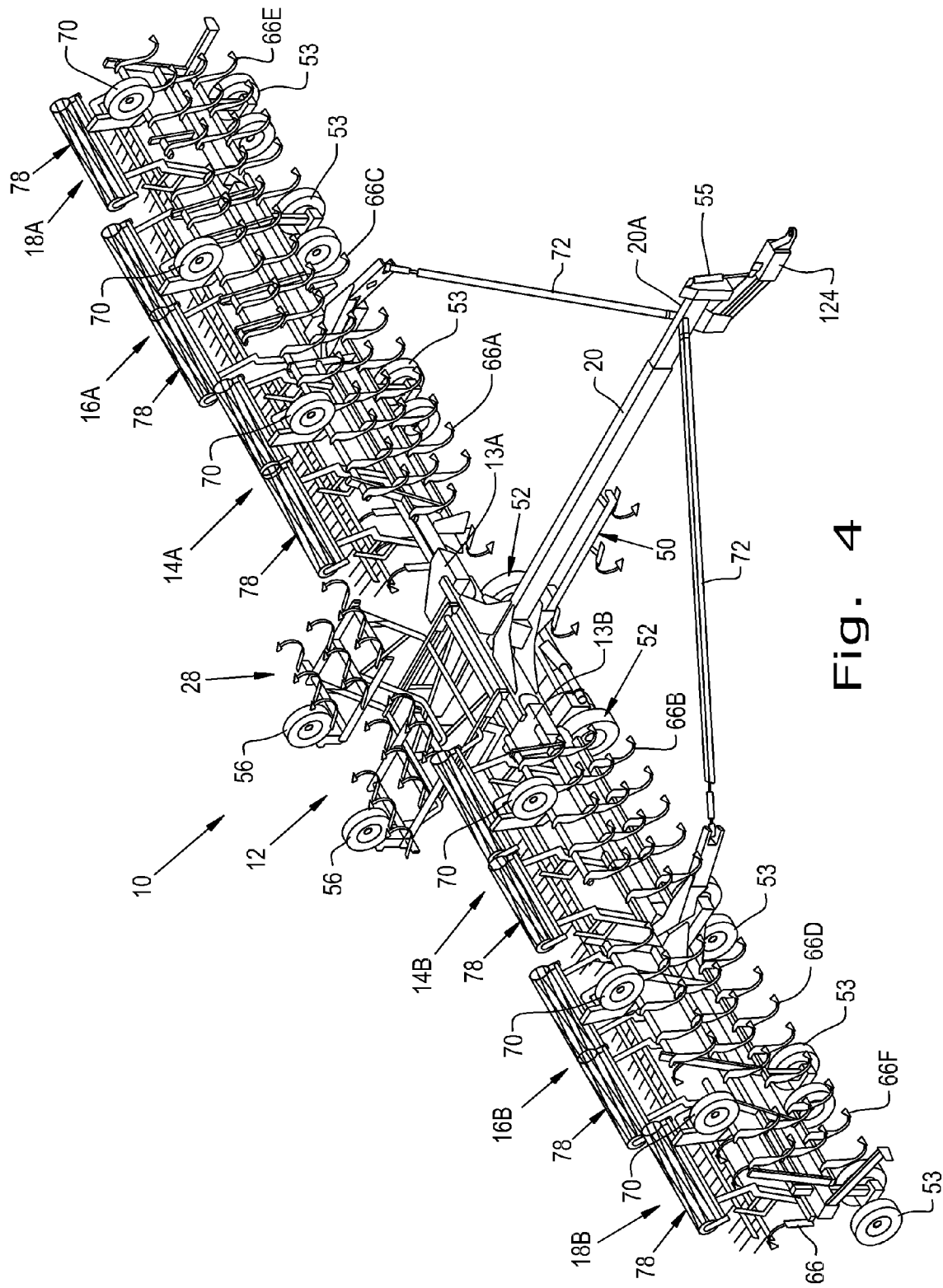
FIG. 4 is a top perspective view of the agricultural tillage implement shown in FIGS. 1-3, with the main shank frame folded rearward to a transport configuration and the wing front shank frames and wing section rear auxiliary implements folded upwards to a transport configuration.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating configuration (FIGS. 1 and 3), and is foldable up and over the tool bar 24 to a position rearward of tool bar 24 when in a transport configuration (FIGS. 2 and 4). Main shank frame 28 includes two sets of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating configuration. The outboard ends 46 of cross frame members 44 are coupled with a pair of respective main shank sub-frames 48. Main shank sub-frames 48 are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48 are spaced apart on either side of pull hitch tube 20, center shank sub-frame 50 functions to till the soil in the intermediate open space between the two main shank sub-frames 48. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48. In the illustrated embodiment, main shank frame 28 includes two gauge wheel assemblies 56 which are respectively coupled with a front of a respective main shank sub-frame 48. A hydraulic cylinder 58 is used to fold main shank frame 28 from the operating configuration to the transport configuration, and vice versa. Hydraulic cylinder 58 may optionally be placed in a "float mode" such that gauge wheel assemblies 56 are operable to float up and down as they traverse across a field and thereby set the operating depth at the front edge of main shank frame 28.

Main shank frame 28 may also include additional support frame members 60 and 62 which provide structural rigidity. Support frame members 60 extend diagonally across the top of main shank frame 28, and support frame members 62 extend diagonally between the outboard ends 46 of cross frame members 44.

During use, it is periodically necessary to move the agricultural tillage implement 10 from an unfolded (operating) configuration to a folded (transport) configuration. Hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Toolbar lift wheels 53 lift wing sections 14A, 14B, 16A, 16B, 18A, and 18B to the raised transport position along with main frame section 12, which toolbar lift wheels 53 are then allowed to caster or pivot.

Hydraulic cylinder 58 is then actuated to fold main shank frame 28 up and over tool bar 24 to an inverted position above and rearward of tool bar 24 (FIGS. 2 and 4). Crumbler basket 34 of main rear auxiliary implement 30 may then also be moved to a raised position. Then the wing front shank frames 66A, 66B, 66C, 66D, 66E, and 66F of the wing sections 14A, 14B, 16A, 16B, 18A, and 18B are folded upwards to a position at or near vertical using hydraulic cylinders 68 (FIG. 4). Wing front shank frames 66A, 66B, 66C, 66D, 66E, and 66F of the wing sections 14A, 14B, 16A, 16B, 18A, and 18B may be folded upwards to the generally vertical position at the same time, or may be folded upwards to the generally vertical position sequentially.

Wing section rear auxiliary implements 78, which may include spring tooth drags, crumbler baskets, spike tooth drags, cultivator shanks, or any combination thereof, may then also be folded upwards to a position at or near vertical. Wing section rear auxiliary implements 78 may also be folded upwards to a generally vertical position at the same time, or may be folded upwards to the generally vertical position sequentially. Further, crumbler basket 34 of main rear auxiliary implement 30 may be moved to its raised position at the same time that wing section rear auxiliary implements 78 are folded upwards to their generally vertical positions.

Figure 5:
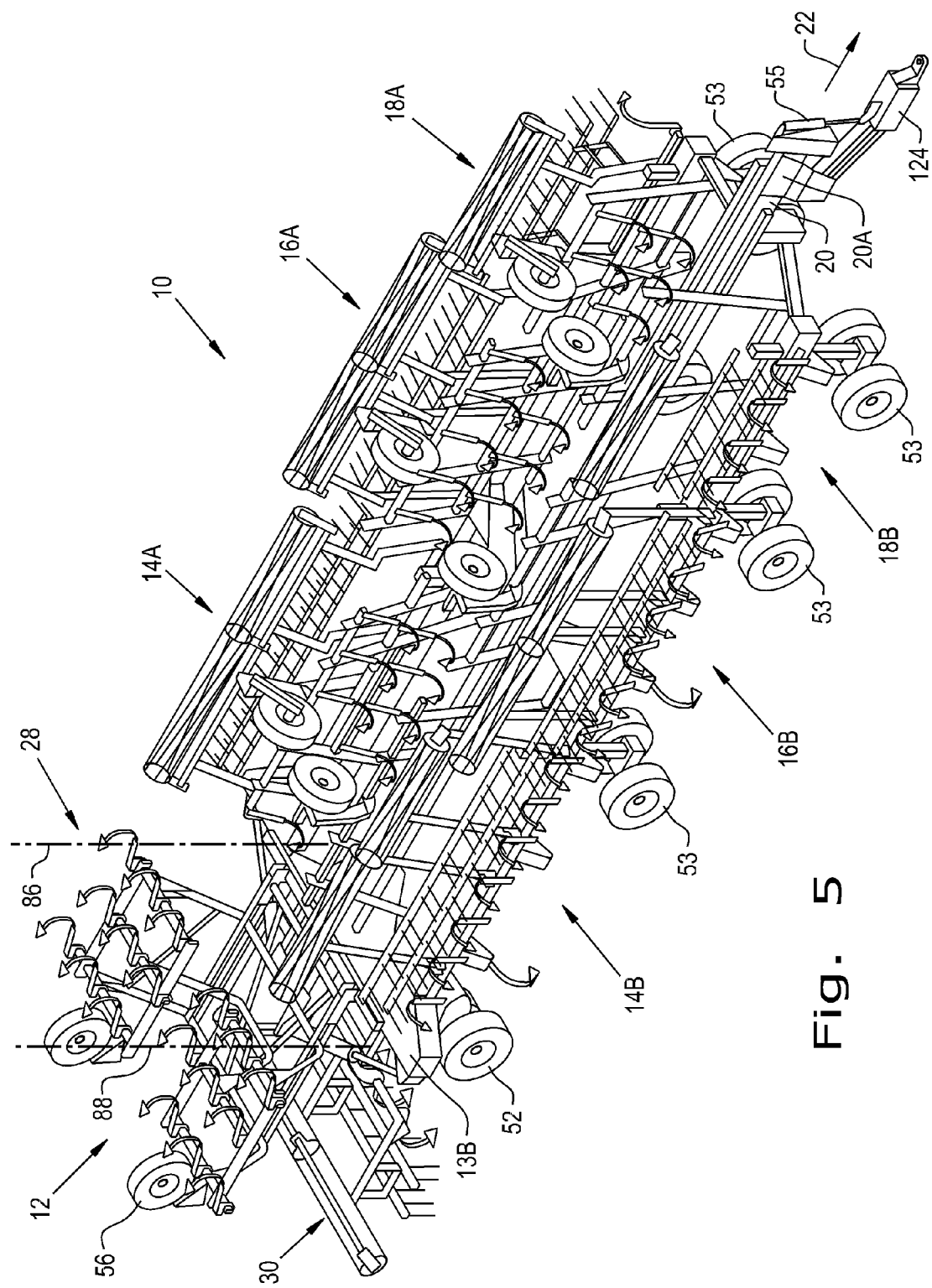
FIG. 5 is a top perspective view of the agricultural tillage implement shown in FIGS. 1-4, with the wing sections folded forward about at least one generally vertical axis to a transport configuration.

Diagonally angled draft tubes 72 extending between a forward end of pull hitch tube 20 and a respective tool bar 24 associated with the pair of middle wing sections 16A and 16B are then folded inward, and wing sections 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 5). Gauge wheel assemblies 56 at the front of main shank frame 28 and gauge wheel assemblies 70 at the front of wing sections 14A, 14B, 16A, 16B, 18A, and 18B are all configured as caster wheels and are not in contact with the ground when agricultural tillage implement 10 is in the folded or transport configuration. For unfolding the agricultural tillage implement 10 to the operating configuration, the reverse folding sequence is carried out.

Figure 6:
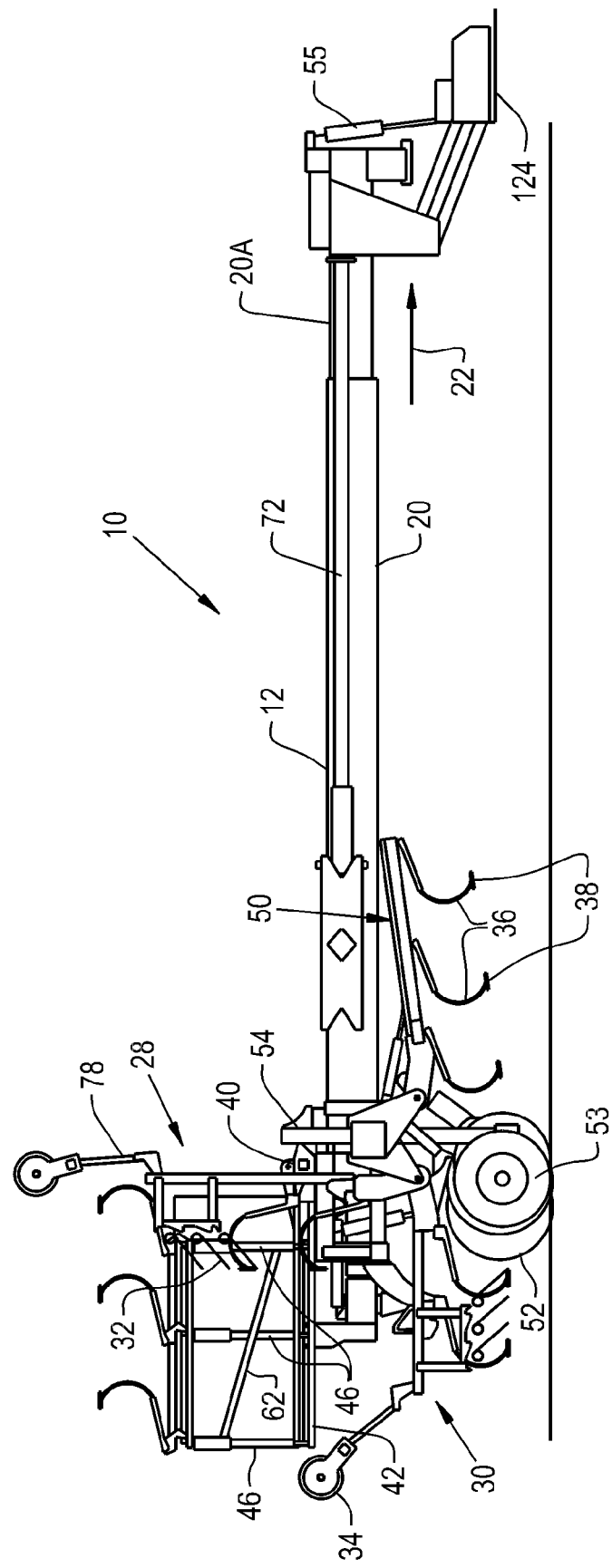
FIG. 6 is a side view of the agricultural tillage implement shown in FIGS. 1-5, with the main shank frame in the transport position, the main frame lifted, the center shank sub-frame raised, the crumbler basket of the main rear auxiliary implement raised, and the wing section rear auxiliary implements in their generally vertical positions.

FIG. 6 shows a side view of the agricultural tillage implement shown in FIGS. 1-5, with the main shank frame 28 in the transport position, the main frame 12 lifted, the center shank sub-frame 50 raised, and the crumbler basket 34 of the main rear auxiliary implement 30 raised. For clarity, the wing front shank frames 66A, 66B, 66C, 66D, 66E, and 66F and the wing section rear auxiliary implements 78 are not shown.

Figure 7:
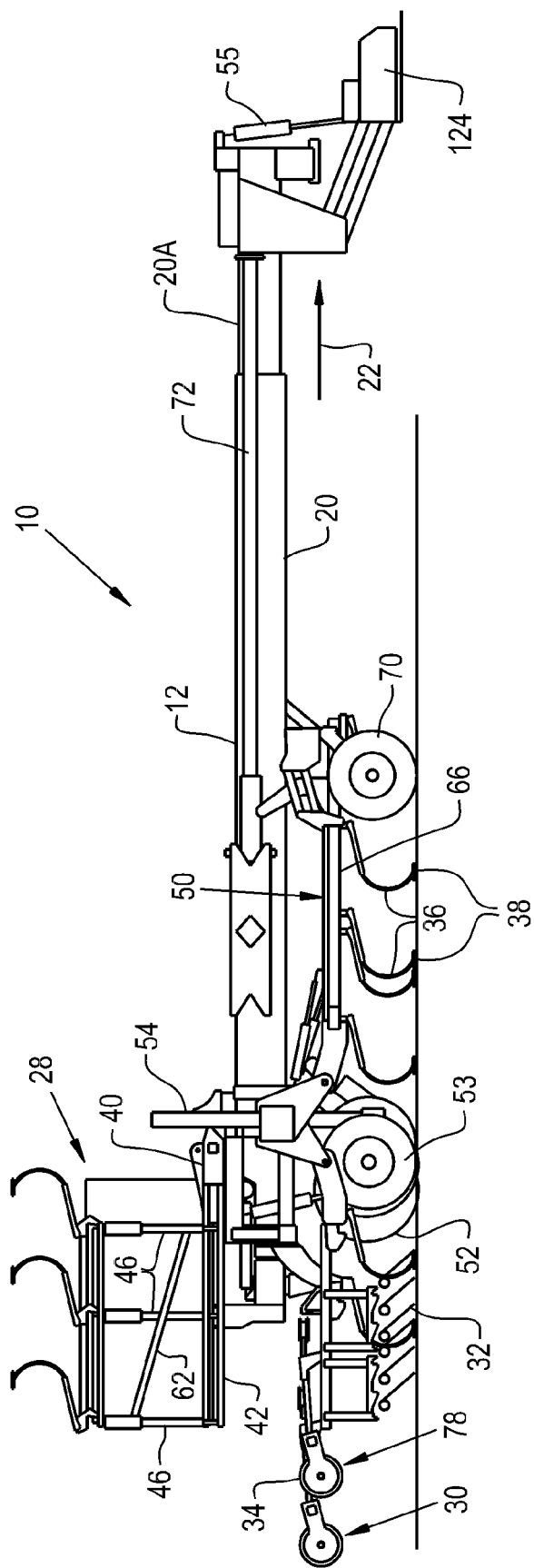
FIG. 7 is another side view of the agricultural tillage implement, similar to FIG. 6, with the main shank frame shown in the transport position for clarity, the main frame lowered, the center shank sub-frame lowered, the crumbler basket of the main rear auxiliary implement lowered, and the wing front shank frames and wing section rear auxiliary implements in their generally horizontal positions.
Figure 8:
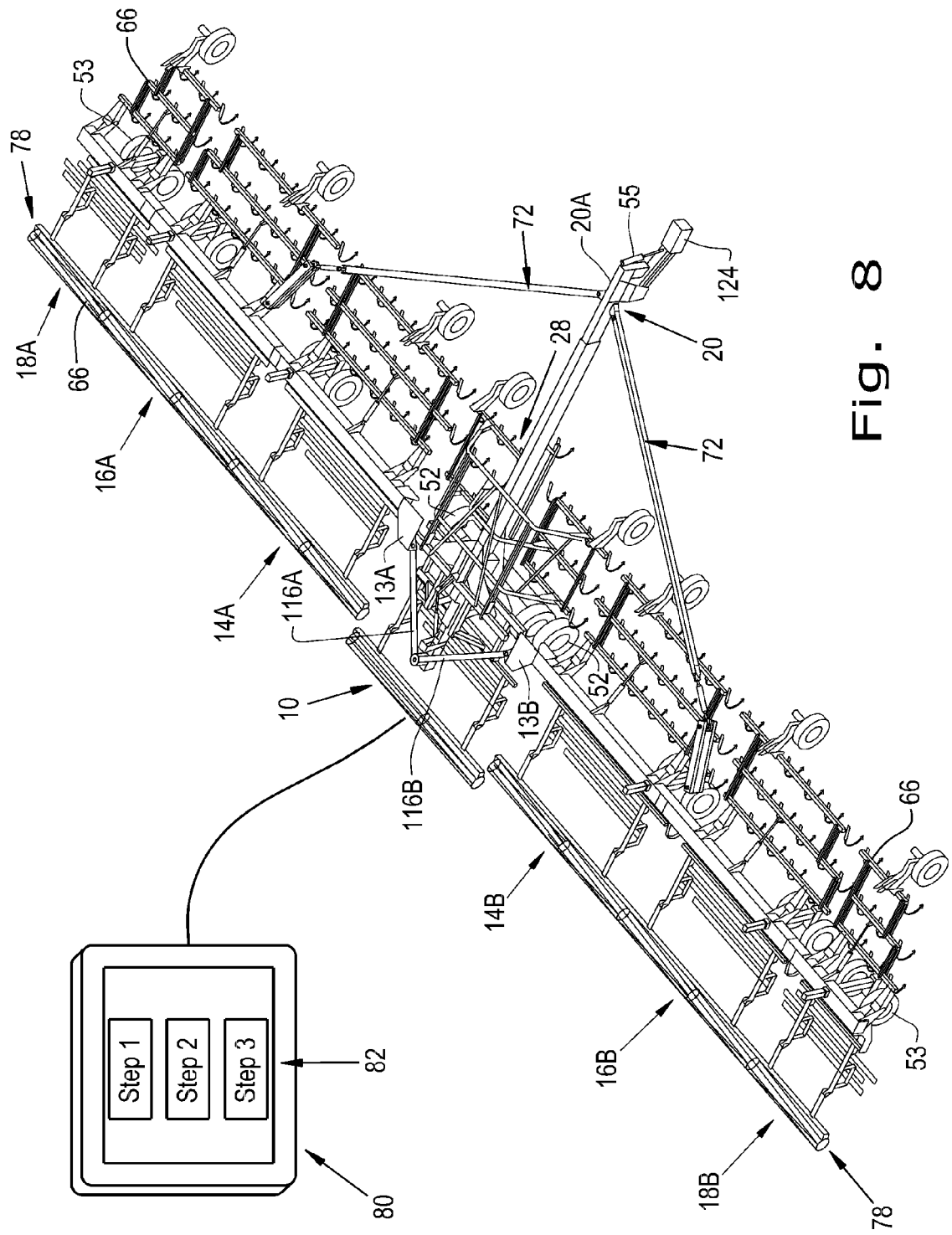
FIG. 8 is an illustration of a controller for controlling the agricultural tillage implement in an embodiment of a sequence screen, the controller being linked to the hydraulic cylinders of the agricultural tillage implement.

FIG. 7 shows another side view of the agricultural tillage implement, similar to FIG. 6, with the main shank frame 28 shown in the transport position for clarity, the main frame 12 lowered, the center shank sub-frame 50 lowered, the crumbler basket 34 of the main rear auxiliary implement 30 lowered, and the wing front shank frames 66A, 66B, 66C, 66D, 66E, and 66F and wing section rear auxiliary implements 78 in their generally horizontal positions;

FIG. 8 shows a controller 80 for controlling the agricultural tillage implement, embodied in the form of a sequence screen 82, which controller 80 is linked to the agricultural tillage implement's hydraulic cylinders. The controller 80 may be an electrical processing circuit (EPC), which EPC may be configured as any type of suitable processor, such as a digital controller, an analog processor, hardwired components, or an application specific integrated circuit (ASIC). Alternately, the controller 80 may be generally hydraulic in nature, such as a valve body or series of hydraulic valves, with the sequence screen directly controlling solenoid valves. The sequence screen 82 prompts an operator of the agricultural tillage implement to take a folding sequence of steps in order to reconfigure the agricultural tillage implement from an operating configuration to a transport configuration, or an unfolding sequence of steps in order to reconfigure the agricultural tillage implement from a transport configuration to an operating configuration as appropriate. The sequence screen 82 embodiment of the controller 80 may make each of the steps of the folding or unfolding sequence of steps available to the operator of the agricultural tillage implement only upon completion of the previous step. The controller 80 embodied in the form of a sequence screen 82 may determine successful initiation and completion of each of the steps using limit switches, proximity sensors, or hydraulic pressure sensors.

Figure 9:
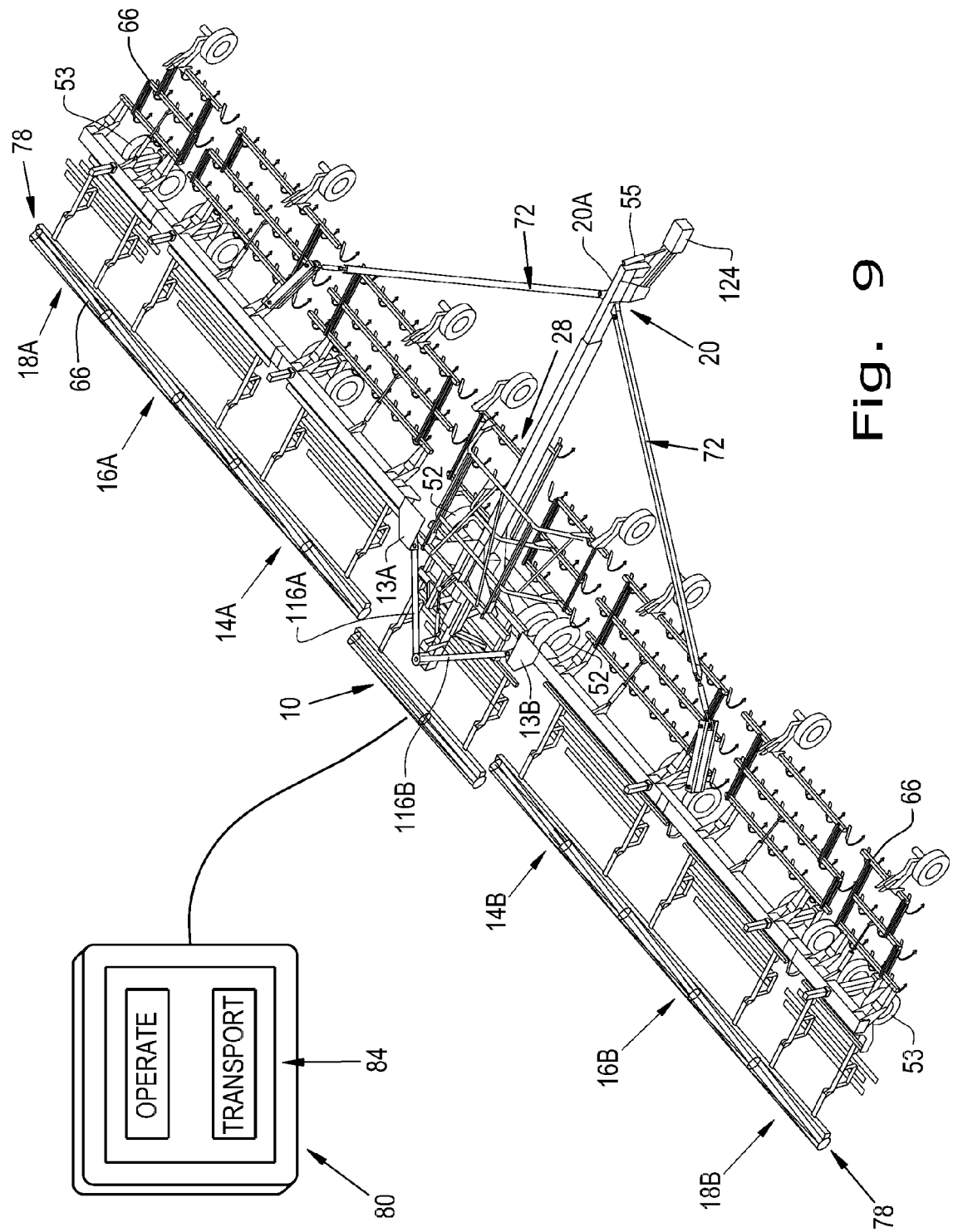
FIG. 9 is another illustration of a controller for controlling the agricultural tillage implement, in an embodiment of an automated control device, the controller being linked to the hydraulic cylinders of the agricultural tillage implement.

FIG. 9 shows another controller 80 for controlling the agricultural tillage implement, embodied in the form of an automated control device 84, which controller 80 is also linked to the agricultural tillage implement's hydraulic cylinders. The automated control device 84 automatically takes a folding sequence of steps in order to reconfigure the agricultural tillage implement from an operating configuration to a transport configuration, or an unfolding sequence of steps in order to reconfigure the agricultural tillage implement from a transport configuration to an operating configuration upon prompting by the operator of the agricultural tillage implement. Similar to the controller 80 embodied in the form of a sequence screen 82, the controller 80 embodied in the form of an automated control device 84 may also determine successful initiation and completion of each of the steps using limit switches, proximity sensors, or hydraulic pressure sensors.

The folding sequence of steps to reconfigure the agricultural tillage implement from an operating configuration to a transport configuration may include pivoting the main shank frame 28 up and over the tool bar 24, pivoting the wing front shank frames 66A, 66B, 66C, 66D, 66E, and 66F to a generally vertical position and locking the wing front shank frames 66A, 66B, 66C, 66D, 66E, and 66F in the generally vertical position, and pivoting the wing sections 14A, 14B, 16A, 16B, 18A, and 18B about generally vertical axes 86 and 88 to a position adjacent to and generally parallel with the pull hitch tube 20. The folding sequence of steps to reconfigure the agricultural tillage implement from an operating configuration to a transport configuration may alternately include raising the main frame section 12 using hydraulic cylinder 54 connected to rear lift wheels 52 and using hydraulic cylinder 55 connected to pull hitch 124 while raising the wing sections 14A, 14B, 16A, 16B, 18A, and 18B using the toolbar lift wheels 53, raising the center shank sub-frame 50, pivoting the main shank frame 28 up and over the tool bar 24, raising the crumbler basket 34 of the main rear auxiliary implement 30, pivoting the wing front shank frames 66A, 66B, 66C, 66D, 66E, and 66F to a generally vertical position and locking the wing front shank frames 66A, 66B, 66C, 66D, 66E, and 66F in the generally vertical position, pivoting the wing section rear auxiliary implements 78 to a generally vertical position and locking the wing section rear auxiliary implements 78 in the generally vertical position, and pivoting the wing sections 14A, 14B, 16A, 16B, 18A, and 18B about generally vertical axes 86 and 88 to a position adjacent to and generally parallel with the pull hitch tube 20. The folding sequence of steps to reconfigure the agricultural tillage implement from an operating configuration to a transport configuration may further include pivoting the wing front shank frames 66A, 66B, 66C, 66D, 66E, and 66F to a generally vertical position in a sequential manner.

The unfolding sequence of steps to reconfigure the agricultural tillage implement from a transport configuration to an operating configuration may include pivoting the wing sections 14A, 14B, 16A, 16B, 18A, and 18B outward about generally vertical axes 86 and 88 to a position perpendicular to the pull hitch tube 20, unlocking and pivoting the wing front shank frames 66A, 66B, 66C, 66D, 66E, and 66F to a generally horizontal position, and pivoting the main shank frame 28 down and forward of the tool bar 24. The unfolding sequence of steps to reconfigure the agricultural tillage implement from a transport configuration to an operating configuration may alternately include pivoting the wing sections 14A, 14B, 16A, 16B, 18A, and 18B outward about generally vertical axes 86 and 88 to a position perpendicular to the pull hitch tube 20, unlocking and pivoting the wing front shank frames 66A, 66B, 66C, 66D, 66E, and 66F to a generally horizontal position, unlocking and pivoting the wing section rear auxiliary implements 78 to a generally horizontal position, pivoting the main shank frame 28 down and forward of the tool bar 24, lowering the crumbler basket 34 of the main rear auxiliary implement 30, lowering the center shank sub-frame 50, and lowering the main frame section 12 using hydraulic cylinder 54 connected to rear lift wheels 52 and using hydraulic cylinder 55 connected to pull hitch 124 while lowering the wing sections 14A, 14B, 16A, 16B, 18A, and 18B using the toolbar lift wheels 53. The unfolding sequence of steps to reconfigure the agricultural tillage implement from a transport configuration to an operating configuration may further include pivoting the wing front shank frames 66A, 66B, 66C, 66D, 66E, and 66F to a generally horizontal position in a sequential manner.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a main frame section including a pull hitch tube extending in a travel direction, and a tool bar attached to and extending transverse to said pull hitch tube;
a main shank frame pivotally coupled with said tool bar, said main shank frame operable to pivot up and over said tool bar when in a transport configuration, said main shank frame further operable to pivot down and forward of said tool bar when in an operating configuration;
at least one wing section pivotally coupled with said main frame section, said at least one wing section operable to pivot forward about at least one generally vertical axis to a position adjacent to and generally parallel with said pull hitch tube when in said transport configuration, said at least one wing section operable to pivot outward about said at least one generally vertical axis to a position perpendicular to said pull hitch tube when in said operating configuration;
at least one wing front shank frame pivotally coupled with said at least one wing section, said at least one wing front shank frame operable to pivot to a generally vertical position when in said transport configuration, said at least one wing front shank frame operable to pivot to a generally horizontal position when in said operating configuration; and
a controller for controlling said main shank frame, said at least one wing section, and said at least one wing front shank frame, said controller operable to reconfigure the agricultural tillage implement from said operating configuration to said transport configuration by a folding sequence of steps, said folding sequence of steps comprising:
a first step of pivoting said main shank frame up and over said tool bar;
a second step of pivoting said at least one wing front shank frame to said generally vertical position; and
a third step of pivoting said at least one wing section forward about said at least one generally vertical axis to said position adjacent to and generally parallel with said pull hitch tube.

2. The agricultural tillage implement of claim 1, wherein:
said controller is further operable to reconfigure the agricultural tillage implement from said transport configuration to said operating configuration by an unfolding sequence of steps, said unfolding sequence of steps comprising:
a first step of pivoting said at least one wing section about said at least one generally vertical axis to said position perpendicular to said pull hitch tube;
a second step of pivoting said at least one wing front shank frame to said generally horizontal position; and
a third step of pivoting said main shank frame down and forward of said tool bar.

3. The agricultural tillage implement of claim 1, wherein:
said controller further comprises a sequence screen, said sequence screen presenting an operator of the agricultural tillage implement said folding sequence of steps, each of said folding sequence of steps being available for selection by said operator upon completion of the previous step.

4. The agricultural tillage implement of claim 1, wherein:
said controller further comprises an automated control device, said automated control device initiating each of said folding sequence of steps in order upon completion of the previous step.

5. The agricultural tillage implement of claim 1, further comprising:
at least one wing section rear auxiliary implement pivotally coupled with said at least one wing section, said at least one wing section rear auxiliary implement operable to pivot to a generally vertical position when in said transport configuration, said at least one wing section rear auxiliary implement operable to pivot to a generally horizontal position when in said operating configuration, said controller further operable to pivot said at least one wing section rear auxiliary implement to said generally vertical position during said second step of said folding sequence of steps.

6. The agricultural tillage implement of claim 1, wherein:
said at least one wing section further comprises at least one right wing section and at least one left wing section; and
said at least one wing front shank frame further comprises at least one right wing front shank frame and one left wing front shank frame.

7. The agricultural tillage implement of claim 6, wherein:
said at least one right wing section further comprises a right inner wing section, a right middle wing section, and a right outer wing section;
said at least one left wing section further comprises a left inner wing section, a left middle wing section, and a left outer wing section;
said at least one right wing front shank frame further comprises a right inner wing front shank frame, a right middle wing front shank frame, and a right outer wing front shank frame;
said at least one left wing front shank frame further comprises a left inner wing front shank frame, a left middle wing front shank frame, and a left outer wing front shank frame; and
said controller is further operable to sequentially pivot said left and right outer wing front shank frames to said generally vertical position, said left and right middle wing front shank frames to said generally vertical position, and said left and right inner wing front shank frames to said generally vertical position during said second step of said folding sequence of steps.

8. The agricultural tillage implement of claim 1 further comprising:
a center shank sub-frame attached to and positioned below said pull hitch tube, said center shank sub-frame operable to raise in said transport configuration, said center shank sub-frame operable to lower in said operating configuration;
at least one rear lift wheel and a pull hitch attached to said main frame section, said at least one rear lift wheel and said pull hitch operable to raise said main frame section in said transport configuration, said at least one rear lift wheel and said pull hitch further operable to lower said main frame section in said operating configuration; and
said controller is further operable to raise said center shank sub-frame and operate said at least one rear lift wheel and said pull hitch to raise said main frame section prior to said first step in said folding sequence of steps.

9. The agricultural tillage implement of claim 1, further comprising:
a crumbler basket of a main rear auxiliary implement pivotally attached to said main rear auxiliary implement, said crumbler basket operable to pivot to a raised position when in said transport configuration, said crumbler basket operable to pivot to a lowered position when in said operating configuration, said controller being further operable to pivot said crumbler basket of said main rear auxiliary implement to said raised position during said first step of said folding sequence of steps.

10. A system for reconfiguring an agricultural tillage implement from an operating configuration to a transport configuration, the agricultural implement having a main frame section, a tool bar attached to and extending transverse to a pull hitch tube of the main frame section, a main shank frame pivotally attached to the tool bar, at least one wing section pivotally coupled with the main frame section about at least one generally vertical axis, and at least one wing front shank frame pivotally coupled with the at least one wing section, comprising:
at least one main shank frame hydraulic cylinder connected to the main shank frame and operable to pivot the main shank frame up and over the tool bar;
at least one wing section hydraulic cylinder connected to the at least one wing section and operable to pivot the at least one wing section forward about the at least one generally vertical axis to a position adjacent to and generally parallel with the pull hitch tube of the main frame section;
at least one wing front shank frame hydraulic cylinder connected to the at least one wing front shank frame and operable to pivot said at least one wing front shank frame to a generally vertical position; and
a controller linked to said at least one main shank frame hydraulic cylinder, to said at least one wing section hydraulic cylinder, and to said at least one wing front shank frame hydraulic cylinder, said controller functioning to reconfigure the agricultural tillage implement from the operating configuration to the transport configuration by a folding sequence of steps, said folding sequence of steps comprising:
a first step of pivoting the main shank frame up and over the tool bar using said at least one main shank frame hydraulic cylinder;
a second step of pivoting the at least one wing front shank frame to said generally vertical position using said at least one wing front shank frame hydraulic cylinder; and
a third step of pivoting said at least one wing section forward about said at least one generally vertical axis to said position adjacent to and generally parallel with the pull hitch tube of the main frame section using said at least one wing section hydraulic cylinder.

11. The system of claim 10, wherein:
said controller is further operable to reconfigure the agricultural tillage implement from said transport configuration to said operating configuration by an unfolding sequence of steps, said unfolding sequence of steps comprising:
a first step of pivoting the at least one wing section outward about said at least one generally vertical axis to a position perpendicular to the pull hitch tube of the main frame section using said at least one wing section hydraulic cylinder;

a second step of pivoting the at least one wing front shank frame to a generally horizontal position using said at least one wing front shank frame hydraulic cylinder; and a third step of pivoting the main shank frame down and forward of the tool bar using said at least one main shank frame hydraulic cylinder.

12. The system of claim 10, wherein:
said controller has a sequence screen, said sequence screen presenting an operator of the agricultural tillage implement said folding sequence of steps, each of said folding sequence of steps being available for selection by said operator upon completion of the previous step.

13. The system of claim 10, wherein:
said controller is an automated control device, said automated control device initiating each of said folding sequence of steps in order upon completion of the previous step.

14. The system of claim 10, wherein:
the agricultural tillage implement is further provided with at least one wing section rear auxiliary implement pivotally coupled to the at least one wing section, said at least one wing section rear auxiliary implement having at least one wing section rear auxiliary implement hydraulic cylinder; and
said controller is linked to said at least one wing section rear auxiliary implement hydraulic cylinder and is further operable to reconfigure the agricultural tillage implement from the operating configuration to the transport configuration by pivoting the at least one wing section rear auxiliary implement to a generally vertical position using said wing section rear auxiliary implement hydraulic cylinder during said second step of said folding sequence of steps.

15. The system of claim 10, wherein:
the at least one wing section further comprises at least one right wing section and at least one left wing section;
the at least one wing front shank frame further comprises at least one right wing front shank frame and at least one left wing front shank frame;
said at least one wing section hydraulic cylinder connected to the at least one wing section further comprises at least one right wing section hydraulic cylinder connected to said at least one right wing section and at least one left wing section hydraulic cylinder connected to said at least one left wing section;
said at least one wing front shank frame hydraulic cylinder connected to the at least one wing front shank frame further comprises at least one right wing front shank frame hydraulic cylinder connected to said at least one right wing front shank frame and at least one left wing front shank frame hydraulic cylinder connected to said at least one left wing front shank frame;
said controller being linked to said at least one right and at least one left wing section hydraulic cylinders and to said at least one right and at least one left wing front shank frame hydraulic cylinders;
said second step further comprising pivoting said at least one right wing front shank frame and said at least one left wing front shank frame to generally vertical positions; and
said third step further comprising pivoting said at least one right wing section and said at least one left wing section about said at least one generally vertical axis to positions adjacent to and generally parallel with the pull hitch tube of the main frame section.

16. The system of claim 15, wherein:
said at least one right wing section further comprises a right inner wing section, a right middle wing section, and a right outer wing section;
said at least one left wing section further comprises a left inner wing section, a left middle wing section, and a left outer wing section;
said at least one right wing front shank frame further comprises a right inner wing front shank frame, a right middle wing front shank frame, and a right outer wing front shank frame;
said at least one left wing front shank frame further comprises a left inner wing front shank frame, a left middle wing front shank frame, and a left outer wing front shank frame;
said at least one right wing section hydraulic cylinder further comprises at least one right inner wing section hydraulic cylinder, at least one right middle wing section hydraulic cylinder, and at least one right outer wing section hydraulic cylinder connected to said right inner wing section, said right middle wing section, and said right outer wing section, respectively;
said at least one left wing section hydraulic cylinder further comprises at least one left inner wing section hydraulic cylinder, at least one left middle wing section hydraulic cylinder, and at least one left outer wing section hydraulic cylinder connected to said left inner wing section, said left middle wing section, and said left outer wing section, respectively;
said at least one right wing front shank frame hydraulic cylinder further comprises at least one right inner wing front shank frame hydraulic cylinder, at least one right middle wing front shank frame hydraulic cylinder, and at least one right outer wing front shank frame hydraulic cylinder connected to said right inner wing front shank frame, said right middle wing front shank frame, and said right outer wing front shank frame, respectively;
said at least one left wing front shank frame hydraulic cylinder further comprises at least one left inner wing front shank frame hydraulic cylinder, at least one left middle wing front shank frame hydraulic cylinder, and at least one left outer wing front shank frame hydraulic cylinder connected to said left inner wing front shank frame, said left middle wing front shank frame, and said left outer wing front shank frame, respectively;
said controller being linked to each of said at least one right inner, right middle, right outer, left inner, left middle, and left outer wing section hydraulic cylinders and to each of said at least one right inner, right middle, right outer, left inner, left middle, and left outer wing front shank frame hydraulic cylinders; and
said controller is further operable to reconfigure the agricultural tillage implement from the operating configuration to the transport configuration by sequentially pivoting said left and right outer wing front shank frames to said generally vertical position, said left and right middle wing front shank frames to said generally vertical position, and said left and right inner wing front shank frames to said generally vertical position during said second step of said folding sequence of steps.

17. The system of claim 10, wherein:
said controller is further operable to reconfigure the agricultural tillage implement from the operating configuration to the transport configuration by raising a center shank sub-frame prior to said first step in said folding sequence of steps, said center shank sub-frame being attached to and position below the pull hitch tube of the main frame section, and by operating at least one rear lift wheel and a pull hitch to raise the main frame section prior to said first step in said folding sequence of steps, said at least one rear lift wheel and said pull hitch being attached to the main frame section.

18. The system of claim 10, wherein:
the agricultural tillage implement is further provided with a main rear auxiliary implement having at least one crumbler basket pivotally attached to said main rear auxiliary implement; and
said controller is further operable to reconfigure the agricultural tillage implement from the operating configuration to the transport configuration by pivoting said crumbler basket of said main rear auxiliary implement to a raised position during said first step of said folding sequence of steps.

19. A method of reconfiguring an agricultural tillage implement from an operating configuration to a transport configuration, said method comprising the steps of:
pivoting a main shank frame from a position down and forward of a tool bar to a position up and over said tool bar, said main shank frame being pivotally attached to said tool bar, said tool bar being attached to and extending transverse to a pull hitch tube of a main frame section;
pivoting at least one wing front shank frame to a generally vertical position, said at least one wing front shank frame being pivotally coupled with at least one wing section, said at least one wing section being pivotally coupled with said main frame section about at least one generally vertical axis; and
pivoting said at least one wing section forward about said at least one generally vertical axis to a position adjacent to and generally parallel with said pull hitch tube of said main frame section.

20. A method of reconfiguring an agricultural tillage implement from an operating configuration to a transport configuration, the method comprising the steps of:
pivoting a main shank frame up and over a tool bar, said main shank frame being pivotally attached to said tool bar, said tool bar being attached to and extending transverse to a pull hitch tube of a main frame section;
pivoting at least one wing front shank frame to a generally vertical position, said at least one wing front shank frame being pivotally coupled with at least one wing section, said at least one wing section being pivotally coupled with said main frame section about at least one generally vertical axis;
pivoting said at least one wing section forward about said at least one generally vertical axis to a position adjacent to and generally parallel with said pull hitch tube of said main frame section;
raising a center shank sub-frame and operating at least one rear lift wheel and a pull hitch to raise said main frame section prior to pivoting said main shank frame up and over said tool bar, said center shank sub-frame being attached to and positioned below said pull hitch tube of said main frame section, and said at least one rear lift wheel and said pull hitch being attached to said main frame section;
pivoting a crumbler basket of a main rear auxiliary implement to a raised position while pivoting said main shank frame up and over said tool bar, said crumbler basket of said main rear auxiliary implement being pivotally attached to said main rear auxiliary implement; and
pivoting at least one wing section rear auxiliary implement to a generally vertical position while pivoting said at least one wing front shank frame to said generally vertical position, said at least one wing section rear auxiliary implement being pivotally coupled to said at least one wing section.

* * * * *